United States Patent [19]

Robison et al.

[11] 3,844,461

[45] Oct. 29, 1974

[54] PRECISE INDEXING APPARATUS AND METHOD

[75] Inventors: Samuel Clifford Robison, Manchester; Heinz Joseph Gerber, West Hartford, both of Conn.

[73] Assignee: Gerber Scientific Instrument Company, South Windsor, Conn.

[22] Filed: Apr. 9, 1973

[21] Appl. No.: 349,614

[52] U.S. Cl............... 226/8, 226/53, 226/67, 226/95, 226/162, 226/171, 33/1 M, 346/136
[51] Int. Cl............................................. B65h 17/36
[58] Field of Search............ 226/158, 171, 162–167, 226/67, 95, 68, 8, 53, 134; 33/1 M; 346/136; 83/319

[56] References Cited
UNITED STATES PATENTS

| | | |
|---|---|---|
| 3,560,992 | 2/1971 | Kleiman............................. 346/118 |
| 3,566,728 | 3/1971 | Ohmasu.............................. 83/319 |
| 3,702,922 | 11/1972 | Hall................................... 33/1 M |

*Primary Examiner*—Richard A. Schacher
*Attorney, Agent, or Firm*—McCormick, Paulding & Huber

[57] ABSTRACT

Precise indexing of a strip of sheet material on a flat-bed table traversed in two coordinate directions by an instrument which works over the material is achieved by coupling the sheet material to an instrument carriage and moving the carriage along the table in one direction. Since the carriage has a precision drive system for accurately positioning the instrument over different areas of the table, indexing of the sheet material can be carried out efficiently with the same accuracy as the positioning of the instrument.

25 Claims, 12 Drawing Figures

PRECISE INDEXING APPARATUS AND METHOD

BACKGROUND OF THE INVENTION

The present invention relates to a precision indexing apparatus, and the method by which the apparatus operates, to accurately shift or index sheet material over a work table by precisely controlled amounts. More particularly, the present invention is concerned with an indexing apparatus which employs the same carriage for locating an instrument over the work surface of a table and for shifting a strip of sheet material over the table between instrument operations.

Automatically controlled instrument systems having carriages which move in two coordinate directions over the work surface of a table are well known. Typically, a first carriage traverses the table in one coordinate direction parallel to the work surface and a second carriage mounted on the first moves relative to the first in the other coordinate direction. When an instrument is mounted on the second carriage, composite movements of both carriages allow the instrument to be translated to any point over the region of the work surface traversed by the carriages. Accurate positioning of the carriages and, consequently, of the instrument is achieved by numerical controls which may operate either from an on-line data generator or from previously programmed data.

Automatically controlled machines of this type may be employed with a wide variety of instruments. The instruments may include plotting pens or styluses, light heads, tracking heads and cutting or drilling tools.

In related automatically controlled machines of the prior art, the instrument is suspended from a single carriage which traverses a table in one coordinate direction and a moving work surface on which a sheet material is supported is formed by a conveyor in the other coordinate direction so that relative movements of the instrument and material in any direction over the table are generated by both the carriage and conveyor. In machines of this type, long strips of sheet material can be handled with a table that is relatively short compared to the length of the strip. However, other difficulties related primarily to moving the material as it is operated upon by the instrument are encountered.

It is, accordingly, desirable to have an automatically controlled system employing a two-carriage work table as described above to move an instrument and precisely position it while the sheet material is held stationary. In systems of this type, the bed of the work table must have dimensions commensurate with those of the sheet material unless other means are provided to move the sheet material on a shortened table. Known systems employing two carriages to move an instrument over a stationary material as the instrument operates upon the material have employed a conveyor or separate drive mechanism on a short work table solely for the purpose of shifting the sheet material so that a long strip can be worked upon in segments. Such conveyors or drive mechanisms may also be employed for loading or unloading the table.

The difficulty of working upon strips of material in segments is that movement of the strip, unless it is very precisely controlled, will not permit continuous patterns to extend between adjacent segments of the strip. While the problem of continuity between segments may not be critical in some cases, in many systems it is important. For example, in a high resolution plotting system where a series of lines may extend continuously over several segments of a strip which is longer than the plotting table, the indexing operation, unless accurately controlled, may result in a discontinuity in what should otherwise be a continuous line. Patterns between adjacent segments may either overlap by small amounts or be spaced from one another and in either case the resulting product may be totally unsuited for its intended purpose.

One obvious solution to the indexing problem is to build the conveyor which indexes the material with precision sufficient to maintain fine tolerances during the indexing operation. While such solution is feasible, it is very expensive to incorporate a high precision conveyor in the work table solely for the purpose of indexing the material between work operations.

It is, accordingly, a general object of the present invention to disclose a precision indexing apparatus and method which are efficient and employ existing precision drive equipment in the instrument system.

SUMMARY OF THE INVENTION

The present invention resides in an automatically controlled instrument system in which sheet material is spread on the supporting surface of a work table and is held in a stationary position while an instrument positioned by a precisely controlled carriage works upon the material.

The invention relates to an improved indexing apparatus comprising coupling means attached to the carriage and engageable with the sheet material on the supporting surface. The invention also relates to the method by which the sheet material may be precisely shifted relative to the table in the one direction with the carriage.

The advantage of the invention is that the sheet material may be indexed with a precision drive mechanism that already exists in the system. By securely coupling the sheet material to the carriage, the resulting motion of the material can be executed with the same accuracy as that of the instrument.

DESCRIPTION OF THE PREFERRED EMBODIMENTS

Figure 1:
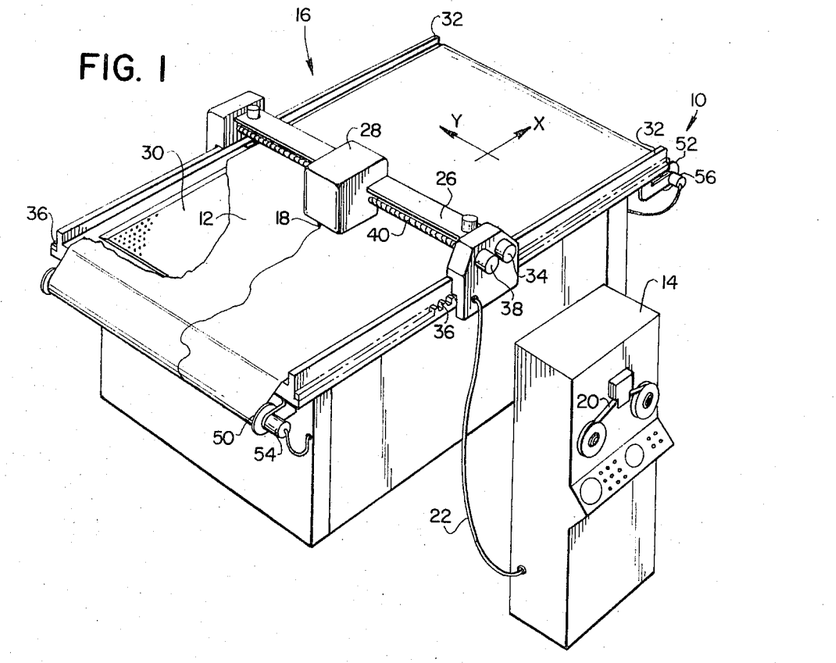
FIG. 1 is a perspective view of an automatically controlled flatbed plotting system in which the present invention is embodied.
Figure 2:
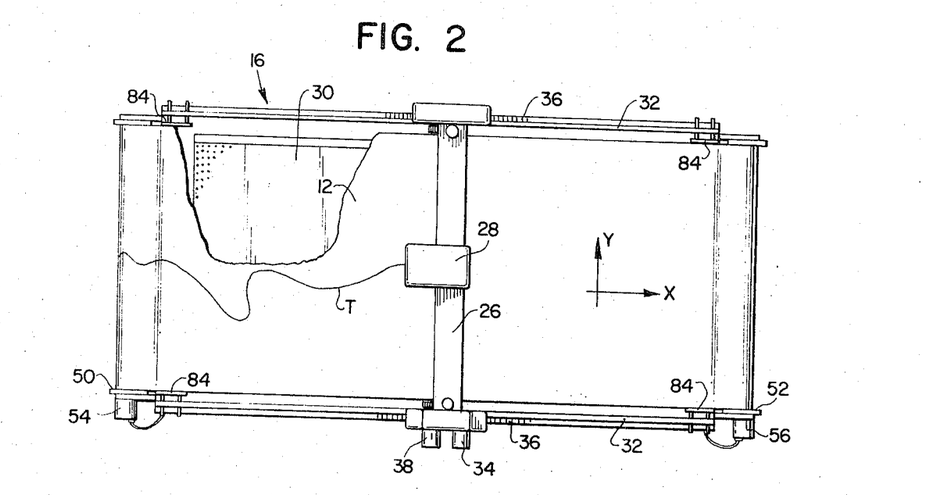
FIG. 2 is a plan view of the plotting table shown in FIG. 1 with a portion of the plotting paper cut away to expose the table bed.
Figure 3:
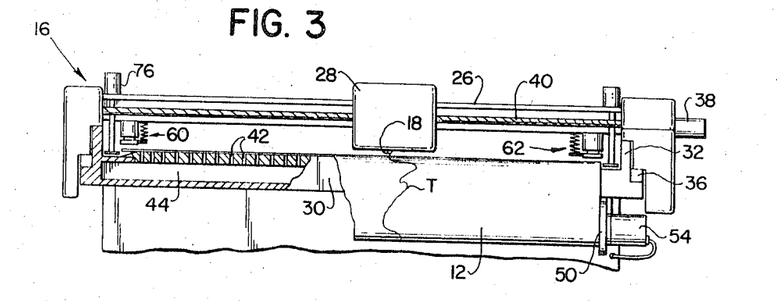
FIG. 3 is a partially sectioned end view of the plotting table in FIG. 1.

FIGS. 1, 2 and 3 show an automatically controlled instrument system embodying the improved indexing apparatus of the present invention. The instrument system illustrated is a numerically controlled plotting system, generally designated 10, which produces graphical information on a strip of sheet material or plotting paper 12. Although a plotting system has been selected for illustration of the invention, the invention can be employed in any type of automatically controlled system having an instrument supported in a carriage for precise positioning over a strip of sheet material that is held stationary relative to the carriage during operation of the instrument. Besides the plotting system, the invention may be employed in systems having light heads, tracking heads, cutting heads and numerous other instruments.

The numerically controlled plotting system 10 is comprised basically of a controller 14 which generates plotting commands and the flatbed plotting table 16 which responds to the commands by causing the plotting head or pen 18 to draw graphic information on the paper 12. The controller 14 reads a plotting program from a punched or magnetic tape 20 and converts the program into motor command signals that are transmitted to the plotting table 16 through control cable 22.

The plotting table 16 includes an X-carriage 26 which moves back and forth over the table in the illustrated X-direction and Y-carriage 28 mounted on the X-carriage and movable relative to the X-carriage in the illustrated Y-direction. Composite motions of the carriages 26 and 28 permit the plotting pen 18 to be translated to any coordinate of the work surface of the table bed 30 which supports the plotting paper 12. The X-carriage 26 is accurately guided during motions in the X-direction by ways 32 extending longitudinally along each lateral edge of the table. An X-drive motor 34 receives commands from the controller 14 and rotates pinions (not shown) that engage gear racks 36 at each side of the table to accurately translate the carriage 26 to different positions along the table.

The Y-carriage 28 is accurately guided on the bridging portion of the X-carriage 26 to move transversely of the table in the Y-direction. A Y-drive motor 38 receives motor command signals from the controller 14 and rotates a lead screw 40 extending in the Y-direction and threadably engaged with the Y-carriage 28 to accurately position the carriage in the Y-direction.

The pen 18 is supported on a Z-carriage (not shown) which allows the pen to be moved in and out of contact with the plotting paper in response to commands from the controller 14 also.

Figure 4:
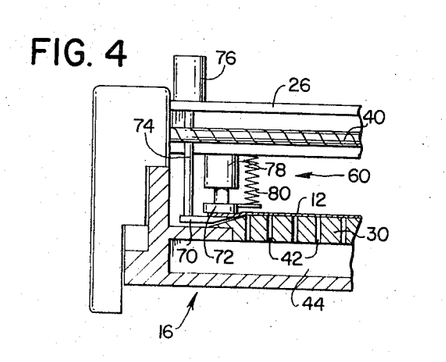
FIG. 4 is a fragmentary end view of the plotting table showing one embodiment of the coupling mechanism in detail.

The bed 30 of the plotting table 16 contains a plurality of small channels or apertures 42 distributed uniformly over the work surface and the apertures communicate, as seen most clearly in FIGS. 3 and 4, with a chamber 44 within the bed. A vacuum pump (not shown) is connected to the chamber 44 and when a piece of sheet material is spread over the work surface of the bed 30, the vacuum pump is turned on to hold the paper 12 in position.

As seen most clearly in FIG. 1, the plotting paper 12 is actually a long strip of sheet material which is supported on rolls or feed spools 50 and 52 respectively held by brackets at opposite longitudinal ends of the table 16. To hold the segment of plotting paper on the table taut before the vacuum system draws the paper tightly against the bed 30, a torque motor 54 is drivably connected to the spool 50 and a torque motor 56 is drivably connected to the spool 52. The motors 54 and 56 may also assist the carriage 26 in shifting the strip of plotting paper in the X-direction as discussed in greater detail below.

Turning more specifically to the present invention, it will be understood that in order to generate graphical information on the entire strip of plotting paper 12, it is necessary to shift or index the paper over the bed 30 of the table 16 in the X-direction from time to time. Where the information is plotted with high accuracy, the shifting of the paper must be performed with equivalent accuracy; otherwise, the trace or traces T on adjacent segments of the paper may be either interrupted or overlapped so that a distortion of the plotted data results.

In prior art systems, the torque motors 54 and 56 receive indexing commands and are used to shift the sheet material in the X-direction when the plotting operation on one segment of the strip is completed. To achieve accurate displacements of the material, however, the torque motors and the associated drive controls would be high accuracy items and would add substantially to the cost of the overall plotting table.

In accordance with the present invention, the X-carriage 26 is utilized to index the strip of plotting paper 12 in the X-direction in conjunction with the ways 32 and gear racks 36. As shown most clearly in FIG. 3 and in the detail view of FIG. 4, coupling mechanism 60 and 62 are suspended from opposite lateral sides of the X-carriage 26 to engage the segment of the strip resting on the supporting surface of the bed 30. When it is desired to index the strip, the X-carriage 26 is engaged with the segment on the bed by means of the coupling mechanisms 60 and 62 and then the carriage is moved in the X-direction along a portion or the full extent of the table to pull a fresh segment of the strip from one of the spools 50 or 52 onto the table while the segment bearing plotted data is reeled onto the other of the spools. Since the X-carriage 26 already possesses a precision drive for positioning the plotting pen 18 or other instrument, indexing of the strip of plotting paper 12 utilizes the existing precision drive and assures that the displacement of the sheet material is executed with the same accuracy as the positioning of the pen.

The coupling mechanisms 60 and 62 are designed alike; hence, for simplicity, only the coupling mechanism 60 is shown in detail in FIG. 4 and described below. The mechanism 60 includes two clamping jaws 70 and 72 which clamp the lateral edge of the strip of plotting paper 12 when the coupling mechanism 60 is actuated during an indexing operation. The jaw 70 is precisely supported directly below the carriage 26 on a rotable shaft 74 connected to a pivot motor 76 so that the jaw 70 may, if desired, be rotated 90° about the vertical axis of the shaft 74 between a position away from the plotting paper 12 and parallel to the X-direction as shown in FIG. 3 and a position under the lateral edge of the plotting paper 12 and parallel to Y-direction as illustrated in FIG. 4. The jaw 72 is supported on the reciprocable armature of electrically actuated solenoid 78. When the solenoid 78 is actuated, the armature thrusts the jaw 72 downwardly to clamp the paper 12 against the jaw 70. A return spring 80 pulls the jaw 72 upwardly away from the paper when the solenoid 78 is de-energized.

In operation, the coupling mechanism 60 is totally disengaged from the plotting paper 12 while a plotting operation is being carried out with the carriages 26 and 28 and the pen 18. The jaw 70 is rotated to the side of the bed 30 out of contact with the paper 12 and the jaw 72 is held above the paper. To engage the paper between plotting operations on adjacent segments, the motor 76 and solenoid 78 are energized and the clamping jaws 70 and 72 close upon the segment of the paper on the bed while the carriage 26 is stopped. It should be noted that the jaw 70 on the lower end of the shaft 74 is supported at a fixed position below the carriage 26 and at an elevation substantially even with the supporting surface of the bed 30. When the jaw 72 is pressed downwardly by the solenoid 78, the plotting paper is not significantly displaced vertically or horizontally, and, accordingly, is coupled directly to the carriage 26 without disturbing the positional relationship of the carriage 26, the bed 30 and the paper 12. After the paper 12 is engaged, it is then displaced a predefined amount in the X-direction by the carriage 26 and disengaged without disturbing the positional relationship of the carriage and the paper. Since the displacement of the carriage relative to the bed 30 is controlled by precision drive mechanisms, the displacement of the paper on the bed 30 is carried out with precision.

Adjustable guide plates 84 shown in FIG. 2 may be positioned adjacent the rolls of plotting paper at the ends of table 16 to guide the paper as it is reeled on and off the spools 50 or 52. The guide plates also assist the carriage 26 in maintaining the position of the strip in the Y-direction.

It should be noted, however, that the alignment in the X- and Y-directions at the junction of graphic information plotted respectively before and after an indexing operation can be maintained by the carriage 26 and the couplings 60 and 62. For example, when all graphical information has been recorded on a segment of the strip covering the bed 30, the carriage 26 is displaced to the end of the plotted data adjacent the spool having the new segment of paper to be plotted upon. The paper is engaged by the coupling mechanisms 60 and 62 and then the vacuum system is de-energized. The paper is then shifted over the bed 30 until the new segment is in position. The vacuum system is reenergized and the new segment is effectively held against the bed 30 while the coupling mechanisms are unclamped. The plotted data at the station where the previous plot terminates will still be in precise registration with the carriages 26 and 28 since the relative positioning of the carriage and the paper at that station in the X- and Y-directions is fixed by the coupling mechanisms before, during and after displacement between the positions of engagement and disengagement.

Several additional steps may be employed during the indexing operation to assist the X-carriage 26 in displacing the strip of plotting paper. The torque motors 54 or 56 may be energized by the controller 14 in order to slave the motors to the carriage 26 as it indexes the material. In slaving, one of the torque motors is de-energized and the other torque motor applies a slight driving torque to the roll and a pulling force to the paper simultaneously with and in coordination with the movement of carriage 26 to relieve strain on the X-drive motor 34 and to avoid stretching or wrinkling of the paper. Also, a reversing valve can be employed in the vacuum system to slightly pressurize the chamber 44 and generate a thin cushion of air serving as a fluid bearing between the plotting paper and the table 16.

Figure 5:
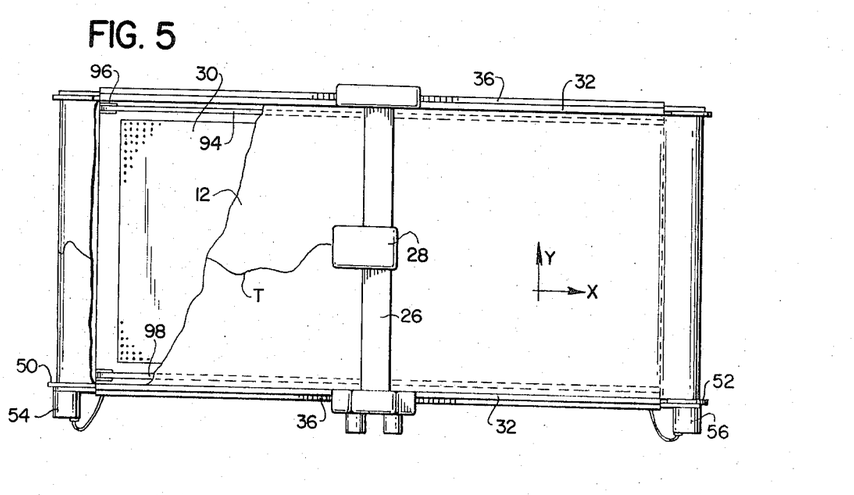
FIG. 5 is a plan view of the plotting table in which the plotting paper is partially cut away to show another embodiment of the coupling mechanism.
Figure 6:
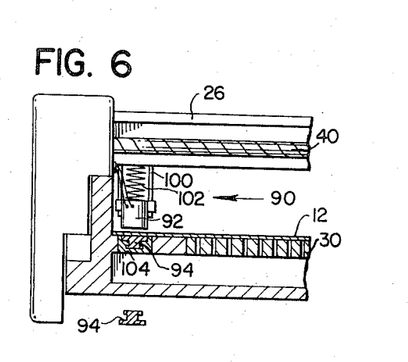
FIG. 6 is a fragmentary end view of the plotting table in FIG. 5 showing the coupling mechanism in detail.

FIGS. 5 and 6 illustrate another embodiment of the coupling mechanism, generally designated 90. The table 16 is constructed in substantially the same manner as the table shown in FIGS. 1–4.

The coupling mechanism 90 is comprised of an electromagnet 92 resiliently supported below the X-carriage 26 and a magnetically sensitive band or belt 94 which encircles the bed 30 of the table. The belt 94 is supported at the longitudinal ends of the table by tensioning rollers 96 so that the portions of the belt extending above and below the bed may be moved freely relative to the table in the X-direction. A corresponding belt 98 and electromagnet (not shown) are mounted on the table and carriage 26 respectively at the opposite side of the table.

The electromagnet 92 is slidably supported on the rods 100 projecting downwardly from the carriage 26. The magnet 92 is guided precisely in the vertical direction by the rods and a return spring 102 supports the magnet so that its lower end is spaced slightly above the sheet material when the magnet is de-energized.

As illustrated, the belt 94 has an I-shaped cross-section and is mounted in the bed 30 in a corresponding I-shaped groove defined in a track 104. The track 104 is mounted fixedly in the bed 30 and is constructed of a magnetically insensitive material so that the electromagnet 92 and the belt 94 will readily slide relative to the track. The track 104 and the belt 94 have an upper surface which is level with the work surface of the bed 30. When the electromagnet 92 is energized and moves downwardly to engage the belt and clamp the intervening plotting paper 12, the belt is retained in the track by its I-shaped configuration and, consequently, the paper 12 is not lifted or otherwise displaced.

In operation, the strip of plotting paper 12 is spread on the bed 30 so that the lateral edges of the material lie on top of the belts 94 and 98. To index the strip over the work surface of the bed 30, the electromagnet 92 is energized and attracted to the belt 94 to clamp the edge of the paper 12 in a manner similar to the jaws 70 and 72 in FIG. 4. The carriage 26 is then displaced along the table in the X-direction and the coupled strip is shifted by a corresponding amount so that a new segment of the strip is positioned on the bed. Again precise positional relationship of the carriage and paper is maintained during the engaging, displacing and disengaging steps of the indexing operation.

Of course, it will be readily apparent that the belt 94 could simply rest on the bed 30 and tension applied to the belt by the rollers 96 might be relied upon to hold the belt in position. It may also be desirable to provide a belt which can be shifted relative to the bed 30 in the Y-direction so that strips of sheet material of varying widths can be accommodated.

Figure 7:
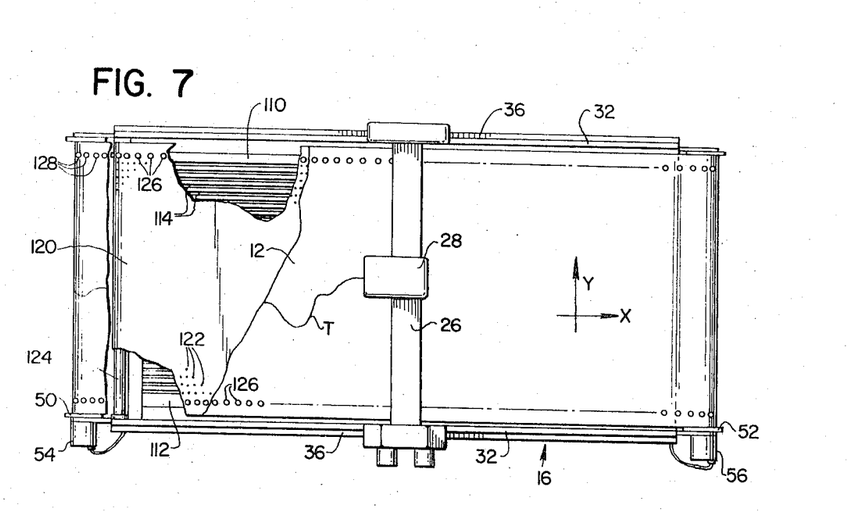
FIG. 7 is a plan view of the plotting table incorporating another embodiment of the present invention.
Figure 8:
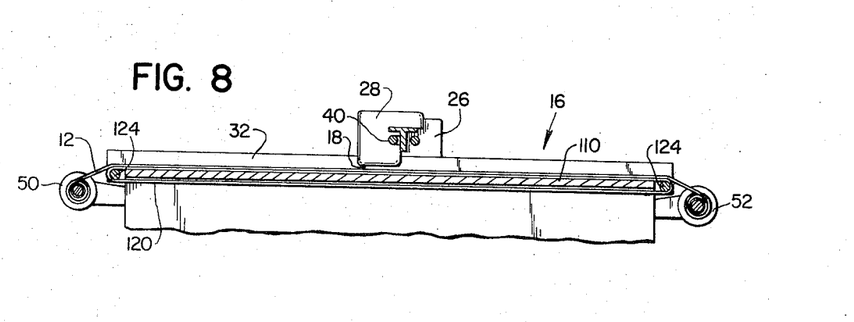
FIG. 8 is a sectioned side elevation view of the plotting table in FIG. 7.
Figure 9:
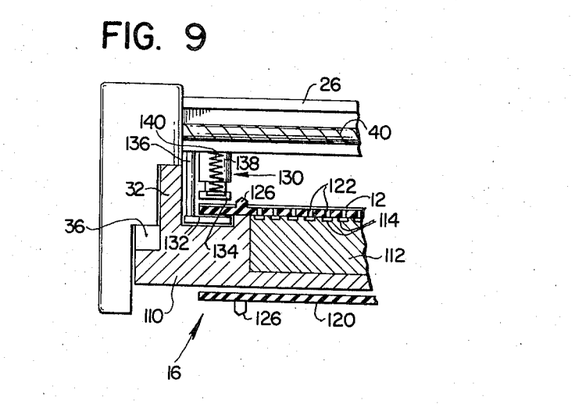
FIG. 9 is a fragmentary end view of the plotting table in FIG. 7 and shows another embodiment of the coupling mechanism in detail.

FIGS. 7–9 illustrate still another embodiment of the present invention on the plotting table 16. In this embodiment of the invention the table 16 includes the carriages 26 and 28 which move the plotting pen 18 to various positions over the plotting paper 12 in the same manner as in FIG. 1. However, the table bed 110 has a construction which differs slightly from the bed 30 in FIG. 1. The bed 110 includes a base 112 defining a plurality of grooves 114 extending longitudinally along the table at the upper surface of the base 112. A large, perforated conveyor belt 120 encircles the bed 110 as seen most clearly in FIG. 8 and includes a multiplicity of perforations or holes 122 which communicate with the plurality of grooves 114 as shown in FIG. 9. A vacuum pump is connected to the grooves 114 so that the sheet material 12 may be held tightly against the work surface of the table defined by the upper portion of the conveyor belt 120. The conveyor belt 120 is supported for movement relative to the table 16 by means of tensioning rollers 124 extending across the table at each longitudinal end. The rollers 124 are journaled at each end in the table and are merely idling rollers; however, they may be driven by torque motors such as those which drive the spools 50 and 52 if desired. The longitudinal grooves allow the vacuum holddown forces to operate upon the paper regardless of the position at which the conveyor stops.

Along each lateral edge of the conveyor belt 120 is a row of integrally formed engagement pins 126 which mates respectively with a corresponding row of apertures 128 along the edge of the strip of plotting paper 12. The engagement pins assist in holding the sheet material in the spread condition in both the X- and Y-directions.

As shown in FIG. 9, a coupling mechanism 130 attached to the carriage 26 closely resembles the mechanism 60 in FIG. 4. The mechanism includes a lower clamping jaw 132 and an upper clamping jaw 134. The lower jaw is suspended from the X-carriage 26 by a fixed rod 136 so that the jaw 132 does not rotate about a vertical axis. The rotation of the lower jaws in both of the embodiments of FIGS. 4 and 9 is optional. The armature of an electrically actuated solenoid 138 supports the upper jaw 134 directly above the lower jaw 132 and the lateral edge of the plotting paper 12 and the conveyor belt 120. When the solenoid 138 is actuated, the jaw 134 is urged downwardly and in conjunction with the jaw 132 couples both the paper and the conveyor belt 120 in precise positional relationship to the carriage 26. When the solenoid 138 is de-energized, the return spring 140 retracts the upper jaw 134 to uncouple the paper and conveyor belt. Of course, another coupling mechanism corresponding to the mechanism 130 is suspended from the X-carriage 26 at the opposite side of the table.

In operation, the embodiment of the invention in FIGS. 7–9 does not differ substantially from the indexing operation described in conjunction with the embodiments of FIGS. 1 and 5. However, the indexing motions of the strip of plotting paper produced by the X-carriage 26 are accompanied by a corresponding movement of the conveyor belt 120 since the paper and belt are clamped to the carriage. It is not essential that the paper extend to the edge of the conveyor belt to establish direct engagement with the coupling mechanism 130. Since the engagement pins 126 fix the relative positioning of the paper and the belt, only the lateral edge of the belt may be clamped by the jaws 132 and 134.

Figure 10:
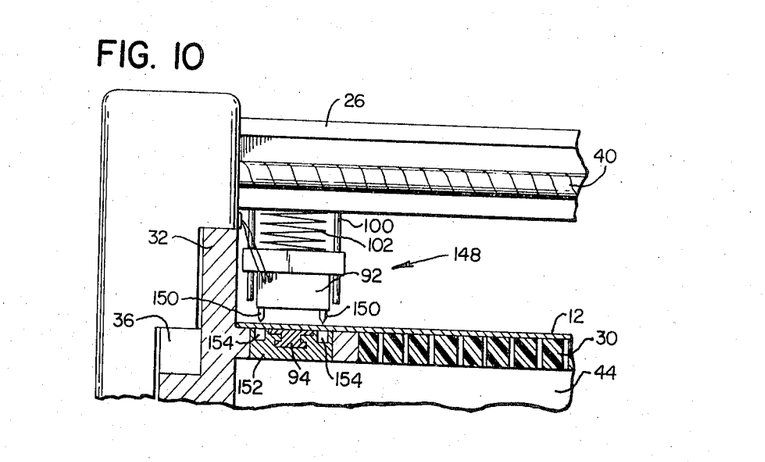
FIG. 10 is a fragmentary end view of the plotting table of FIG. 5 showing another coupling mechanism in detail.

FIG. 10 shows still another embodiment of the coupling mechanism which employs a coupling mechanism 148 similar to the mechanism 90 in FIGS. 5 and 6 with engagement pins 150 added to hold the paper 12 in registration with the X-carriage 26 during an indexing operation. The pins 150 project downwardly from the electromagnet 92 so that the magnet serves as a pin-supporting member. As described above with respect to FIGS. 5 and 6, the electromagnet 92 is slidably supported on the rods 100 and is resiliently held above the supporting surface of the bed 30 by the spring 102 whenever the electromagnet 92 is de-energized. The magnetic belt 94 which encircles the bed 30 is supported in a non-magnetic track 152 which defines a portion of the supporting surface on which the paper 12 rests. A pair of grooves 154 extending longitudinally along the track in the X-coordinate direction register with the respective engagement pins 150 and thusly allow the track 152 to, in a sense, be penetrated by the pins during an indexing operation.

Accordingly, in an indexing operation the electromagnet 92 is energized to draw the magnet 92 and belt 94 into clamping engagement with the paper 12, and the pins 150 penetrate through the paper into the grooves 154. The magnet remains energized as the X-carriage 26 translates over the plotting table and pulls a new segment of engaged paper onto the supporting surface of the bed 30. Basically, the operation is the same as that described in connection with the embodiment of FIGS. 5 and 6 except that the engagement pins 150 slide in the grooves 154 and insure that the paper 12 remains in precise registration with the X-carriage 26 until the indexing operation is completed. At that point in time, electromagnet 92 is de-energized, the vacuum chamber 44 below the bed 30 is evacuated to hold the paper tightly against the supporting surface of the bed and the engagement pins 150 disengage themselves from the paper 12 as the spring 102 lifts the de-energized electromagnet 92 upwardly away from the material.

Figure 11:
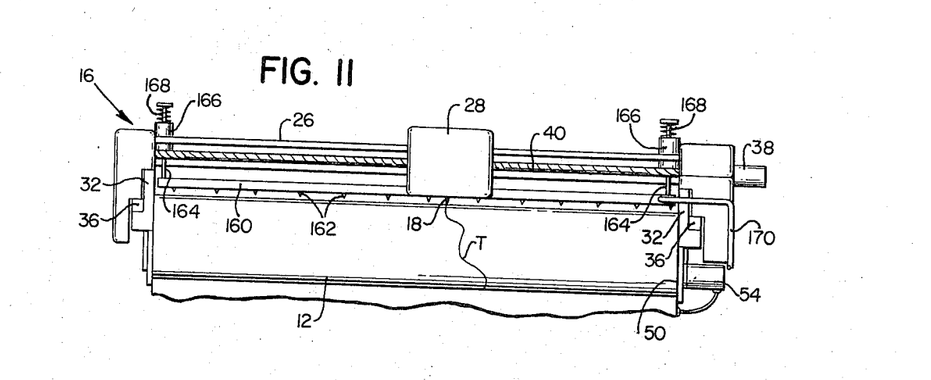
FIG. 11 is an end view of the plotting table in FIG. 1 showing still another embodiment of the coupling mechanism.
Figure 12:
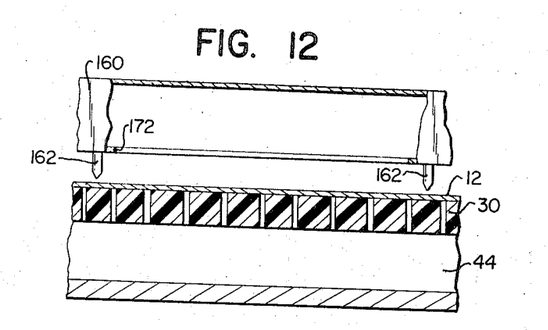
FIG. 12 is a fragmentary end view partially in cross-section and showing the coupling mechanism in FIG. 11 in detail.

FIGS. 11 and 12 illustrate still another embodiment of the coupling mechanism which is comprised of a pin support member in the form of an elongated channel bar 160 extending under the X-carriage 26 from one side of the plotting table to the other in the Y-coordinate direction. A plurality of engagement pins 162 are evenly spaced along the bar 160 and project downwardly toward the paper 12 on the table 16. The bar 160 is suspended directly below the bridging portion of the X-carriage 26 by the operating rods 164 of electrical actuators 166. Springs 168 surrounding the operating rods 164 hold the bar 160 and engagement pins 162 above the paper 12 on the supporting surface of the table 16 wnenever the actuators 166 are de-energized.

During an indexing operation, the actuators are energized to thrust the engagement pins 162 downwardly through the paper 12 and into the bed 30 which in this embodiment of the apparatus would be formed from a penetrable material such as a foamed plastic or possibly a bristled mat. To secure the paper 12 to the channel bar 160 after the pins 162 have been thrust through the paper, the channel bar is constructed in the form of a vacuum chuck by virtue of seals at the ends of the bar, a vacuum line 170 leading to the interior of the channel bar at one end and elongated apertures or slots 172 spaced between each of the pins 162 at the lower surface of the bar. With the pins 162 penetrating through the paper 12 into the bed 30, the interior of the bar is evacuated, and the paper covering the slots 172 is drawn tightly against the bar. The vacuum existing within the bed chamber 44 is then released and the chamber 44 may be pressurized slightly to generate a fluid bearing between the paper 12 and the bed. The electrical actuators 166 are de-energized and the springs 168 lift the bar and the engaged paper 12 slightly above the bed 30 so that the pins are disengaged from the bed and are spaced slightly above the supporting surface of the bed as illustrated in FIGS. 11 and 12. The X-carriage 26 then translates over the table 12 to shift a new segment of the paper onto the supporting surface.

To disengage the sheet material from the pins 162 after the new segment has been shifted onto the table, the vacuum chamber 44 in the table bed is evacuated and the interior of the channel bar 160 is pressurized slightly to respectively pull and force the sheet material back onto the supporting surface. The actuators 166 may also be briefly energized at the point of disengagement to push the paper back onto the table.

If the indexing operation carried out by the apparatus shown in FIGS. 11 and 12 is always initiated by engaging the sheet material at a specific X-coordinate or longitudinal station on the table 16, the entire bed 30 need not be constructed of a penetrable material. Instead, a strip of penetrable material extending laterally across the table in the Y-direction may be provided at the lateral station where the sheet material is always engaged. Of course, a slightly more versatile apparatus could be provided by placing a plurality of such strips at different longitudinal stations along the table.

While the present invention has been described in several preferred embodiments, it should be understood that still other modifications and substitutions can be held without departing from the spirit of the invention. For example, an auxiliary carriage sharing the ways 32, the racks 36 and the controller 14 can also be mounted on the table 16. While the auxiliary carriage would require precision drive motors and gearing capable of displacing a pen with the same accuracy as the X-carriage 26, it may be more convenient to have a separate carriage for indexing the strip of sheet material. Since common ways and racks are used, the positional reference of the two carriages relative to the bed would be the same. The actual clamping devices may be operated electrically, pneumatically, magnetically, hydraulically or manually. The belts in FIGS. 5 and 7 may be rendered magnetically sensitive for an electromagnet such as that illustrated in FIG. 6 by impregnating a flexible rubber binder with finely distributed ferromagnetic powder. Of course, the belts need not be endless belts as illustrated but instead may be reeled on spools at each longitudinal end of the table in the same manner as the strip of plotting paper 12. The invention can also be employed for cutting long markers from strips of fabric or other limp sheet material on cutting tables such as disclosed in U.S. Pat. No. 3,495,492. As mentioned above, the particular instruments utilized by the automatically controlled system may vary widely. Accordingly, the present invention has been described in several preferred embodiments by way of illustration rather than limitation.

We claim:

1. In an automatically controlled instrument system in which sheet material is spread on the supporting surface of a table while a carriage suitable for accurately positioning an instrument which works upon different areas of the spread sheet material is controllably moved in one direction back and forth over the table parallel to the supporting surface and relative to the sheet material in a stationary position, the improvement comprising: coupling means attached to the carriage and engagable with the sheet material on the supporting surface whereby the sheet material may be precisely shifted relative to the table in said one direction with the carriage.

2. In the automatically controlled instrument system, the improvement of claim 1 wherein the coupling means comprises a clamp suspended in precise relationship from the carriage adjacent the supporting surface to engage and hold the material in precise positional relationship relative to the carriage.

3. The improvement of claim 2 wherein the clamp is an electrically actuated clamp.

4. In the automatically controlled instrument system, the improvement of claim 1 further including: a belt extending in said one direction over the table; and wherein the coupling means comprises a clamp connected with the carriage above the belt and engagable with the belt.

5. In the automatically controlled instrument system, the improvement of claim 4 wherein: the belt is an endless belt encircling the table with one portion extending in said one direction over the table and below the sheet material and another portion below the table; and means are provided for supporting the portions of the endless belt for movement back and forth in said one direction relative to the table.

6. The improvement of claim 5 wherein: the endless belt is magnetically sensitive; and the clamp includes an electrically actuated magnet capable of magnetically coupling with the portion of the endless belt extending over the table.

7. In the automatically controlled instrument system, the improvement of claim 1 further including: a conveyor extending in said one direction relative to the table and defining a movable supporting surface on which the sheet material is spread; and the coupling means includes means for engaging the conveyor to shift the sheet material on the conveyor in said one direction relative to the table.

8. The improvement of claim 7 wherein: the conveyor comprises an endless conveyor belt; and wherein rollers mounted to the table and extending transversely of said one direction support the conveyor belt for movement relative to the table.

9. In the automatically controlled instrument system, the improvement as defined in claim 1 further including means connected with the table for generating a fluid cushion between the sheet material on the supporting surface and the table.

10. In the automatically controlled instrument system having a table defining a vacuum bed and a pump for drawing air from the bed to hold the sheet material on the supporting surface, the improvement of claim 9 wherein the means for generating a fluid cushion comprises means for reversing the flow of air from the vacuum bed by the pump.

11. In the automatically controlled instrument system, the improvement of claim 1 wherein the coupling means comprises a pin support member suspended from the carriage and having a number of engagement pins projecting from the member, and means for bringing the member and the sheet material on the supporting surface together to drive the engagement pins through the sheet material.

12. In the automatically controlled instrument system, the improvement of claim 11 further including a penetrable member defining at least a portion of the supporting surface of the table; and the means for bringing comprises means for forcing the engagement pins of the pin support member into the penetrable member.

13. In the automatically controlled instrument system, the improvement of claim 11 further including a non-magnetic track defining at least a portion of the supporting surface of the table and having grooves extending in said one direction along the supporting surface; and the means for bringing comprises thrusting means for pushing the engagement pins through the sheet material into the grooves of the track.

14. In the automatically controlled instrument system, the improvement of claim 11 wherein the pin support member is an elongated member extending a substantial distance over the sheet material transversely of said one direction and the engagement pins project from the elongated member at spaced stations along the member.

15. The improvement of claim 1 wherein the coupling means includes vacuum means for securing the sheet material to the carriage as the material is shifted.

16. A method of precisely indexing a strip of sheet material on the work surface of a table having a carriage which traverses the table in one coordinate direction with precision sufficient to accurately position an instrument that operates upon the material at different areas of the table work surface comprising the steps of: coupling the sheet material to the instrument carriage; and then moving the carriage and the coupled sheet material to precisely shift a new segment of the strip of sheet material onto the work surface.

17. The method of precisely indexing as defined in claim 11 wherein an instrument is mounted on the carriage including the step of stopping the operation of the instrument during the step of moving.

18. The method of precisely indexing as defined in claim 11 wherein an additional step comprises: providing a belt on the table in said one direction, the belt defining the work surface on which the strip of sheet material rests; and the step of coupling comprises engaging the carriage with the belt.

19. The method of claim 18 wherein the step of engaging comprises clamping the belt to the carriage without lifting the belt.

20. The method of claim 18 wherein the step of engaging comprises clamping the belt to the carriage without clamping the sheet material.

21. The method of precisely indexing a strip of sheet material as defined in claim 16 wherein additional steps comprise: providing a conveyor belt movable on the table in said one direction, and spreading a segment of the strip of sheet material on the conveyor belt; and wherein the step of coupling comprises coupling the carriage to the conveyor belt; and the step of moving comprises moving the carriage and the coupled conveyor belt together with the strip of sheet material.

22. The method of precisely indexing as defined in claim 16 further including the steps of: mounting at least one portion of the strip of sheet material in a roll at one end of the table; and rotatably driving the roll of sheet material mounted at one end of the table simultaneously with and in coordination with the moving of the carriage coupled to the sheet material.

23. The method of precisely indexing as defined in claim 16 wherein the step of coupling comprises engaging the strip of sheet material at both lateral edges.

24. The method of indexing a strip of sheet material on the table as defined in claim 16 including the step of supporting the sheet material from the table on a fluid cushion during the step of moving.

25. The method of indexing as defined in claim 24 further including: halting the moving of the carriage and the coupled sheet material after a new segment of the strip is on the work surface; and then holding the new segment of the strip in position on the table with vacuum and uncoupling the sheet material from the carriage.

* * * * *

UNITED STATES PATENT OFFICE
CERTIFICATE OF CORRECTION

PATENT NO. : 3,844,461
DATED : October 29, 1974
INVENTOR(S) : Samuel Clifford Robison and Heinz Joseph Gerber It is certified that error appears in the above-identified patent and that said Letters Patent are hereby corrected as shown below:

Col. 8, line 61, "wnenever" should be --whenever--.

Col. 12, line 2, "11" should be --16--.

Col. 12, line 6, "11" should be --16--.

Signed and sealed this 29th day of April 1975.

(SEAL)
Attest:

RUTH C. MASON
Attesting Officer

C. MARSHALL DANN
Commissioner of Patents
and Trademarks